United States Patent [19]

Jantzi

[11] Patent Number: 4,742,542

[45] Date of Patent: May 3, 1988

[54] TELEPHONE SWITCH-HOOK ACTUATOR APPARATUS

[76] Inventor: C. Earl Jantzi, 43055 Delany Rd., Zion, Ill. 60099

[21] Appl. No.: 908,216

[22] Filed: Sep. 17, 1986

[51] Int. Cl.⁴ ............................................. H04M 1/06
[52] U.S. Cl. ................................... 379/441; 379/420; 379/425; 379/448
[58] Field of Search ............... 379/441, 448, 447, 422, 379/424, 425, 427, 420

[56] References Cited

U.S. PATENT DOCUMENTS

| | | | |
|---|---|---|---|
| 1,847,649 | 3/1932 | Hazard | 379/455 |
| 1,959,572 | 5/1934 | Craig | 379/447 |
| 2,300,114 | 10/1942 | Golseth | 379/420 |
| 2,326,591 | 8/1943 | White | 379/447 |
| 2,473,106 | 6/1949 | Mathieson | 379/447 |
| 2,546,070 | 3/1951 | Henrikson et al. | 379/427 |
| 2,731,522 | 1/1956 | Anklesaria | 379/447 |
| 3,156,771 | 10/1964 | Vaughn | 379/420 |
| 3,170,990 | 2/1965 | Beatty | 379/420 |
| 4,079,196 | 3/1978 | Spanel | 379/448 |

Primary Examiner—Jin F. Ng
Assistant Examiner—Danita R. Byrd
Attorney, Agent, or Firm—Dick and Harris

[57] ABSTRACT

A telephone switch-hook actuator apparatus for use with a telephone unit incorporating a conventional handset whereby the telephone switch-hook actuator apparatus serves to operate the telephone switch-hook in place of the handset. Accordingly, a headset worn upon the users head may be utilized with a conventional telephone unit, particularly those telephone units which utilize electronic logic line switching circuitry.

7 Claims, 1 Drawing Sheet

TELEPHONE SWITCH-HOOK ACTUATOR APPARATUS

BACKGROUND OF THE INVENTION

The present invention relates generally to telephone set accessories and in particular to a telephole switch-hook actuator apparatus for use with a telephone incorporating a conventional handset whereby the telephone switch-hook actuator apparatus serves to operate the telephole switch-hook in place of the handset to connect and disconnect the telephone. The use of the telephole switch-hook actuator apparatus thus serves to permit the use of a "hands off" headset with a conventional telephone set, particularly those which utilize electronic logic line switching circuitry.

Over the years, a number of apparata have been addressed to operating or otherwise obstructing a telephone switch-hook. In normal practice, an individual desiring to place an outgoing call or answer an incoming call must lift the telephone handset off of its cradle to release the switch-hook button to, in turn, connect the telephone to the telephone system. The prior art obstruction devices have almost exclusively been directed toward operating a telephone switch-hook incorporating buttons protruding through opposite ends of the handset craddle or a switch-hook which is integral with the craddle itself. Furthermore, these prior art switch-hook operators typically included complex hinged constructions which permitted a member to be rotated onto the craddle or switch-hook buttons to depress or release same. In some instances, a series of linkages connected a foot pedal to the obstruction member such that depressing the foot pedal operated the telephole switch-hook. Such prior art switch-hook obstruction apparata are described in such patents as J. G. Golseth, U.S. Pat. No. 2,300,114; M. K. Anklesaria, U.S. Pat. No. 2,731,522; D. E. White, U.S. Pat. No. 2,326,591 and T. P. Hazard, U.S. Pat. No. 1,847,649. Unfortunately, however, many of such prior art switch-hook apparata have experienced drawbacks which on occasion have made their use impractical, particularly with today's more contemporary styled telephones. Several of the prior art obstruction apparata have required that the apparata be affixed to the telephone set by screws, clamps or similar fastening devices which result in permanently damaging the cosmetic appearance of the telephone set. Furthermore, permanent modification to the telephone set may be impermissible where the equipment is leased from the telephone company. Virtually all of the telephone hook obstruction devices disclosed by the prior art are specifically and solely designed to be used with telephone sets incorporating the conventional "French style" case having the handset craddle or bracked rearward along the top surface of the telephone unit. Accordingly, such prior art obstruction devices cannot be used with those telephone units which incorporate a well, through which the switch-hook protrudes, and in which the telephone handset rests.

Accordingly, it is an object of the present invention to provide a telephone switch-hook actuator apparatus for use with a telephone set incorporating a conventional handset which rests within a well into which extends the telephone switch-hook.

It is additionally an object of the present invention to provide such an actuator apparatus which will serve to alternatively depress and release the telephone switch-hook thereby taking the place of the telephone handset to permit the utilization of a "hands off" type headset.

Another object of the present invention is to provide such a switch-hook apparatus which is utilized and installed upon the telephone cabinetry without penetrating the surface of the telephone unit or otherwise impairing its cosmetic appearance.

Yet another object of the invention is to provide such a telephone switch-hook actuator apparatus which is weighted and balanced to promote tipping of the apparatus from its horizontal position to its vertical position and simultaneously diminish the impact of the apparatus on the telephone as it is tipped from its vertical position to its horizontal position thereby minimizing noise and cosmetic damage.

It is additionally an object of the present invention to provide such a telephone switch-hook actuator apparatus which is formed of a single cast structure. As part of this object, the switch-hook actuator apparatus is coated with a substantially resilient material to further minimize abrading or otherwise impairing the cosmetic appearance of the telephone set.

These and other objects of invention will become apparent in light of the present specification and drawings.

SUMMARY OF THE INVENTION

The present invention comprises a telephone switch-hook actuator apparatus for use with a telephone set incorporating a conventional handset. The telephone switch-hook actuator apparatus serves to operate the telephone switch-hook which protrudes through the bottom surface of the handset well of the telephone thereby replacing the handset which otherwise would operate the switch-hook. Accordingly, a "hands off" headset may be used with the telephone set in place of the conventional handset device.

A well plate means is provided which substantially corresponds in size and shape to the bottom surface of the handset well through which the telephone's switch-hook protrudes. The well plate means is positioned within the handset well of the telephone proximate to the switch-hook whereby the well plate means may be tipped from a horizontal position to a vertical position within the handset well for alternatively depressing and releasing the telephone switch-hook. It is contemplated, and within the scope of this invention, that the diameter of the well plate means need not correspond exactly to the area of the bottom surface of the handset well through which the switch-hook protrudes. The well plate means need only cover an area of the bottom surface of the handset well sufficient to contact a portion of the switch-hook such that the weight of the well plate means when in its horizontal position will depress the switch-hook.

The well plate means positioned in a horizontal fashion abutting the bottom surface of the handset well, will serve to depress the switch-hook such that the telephone set is disconnected from the telephone system circuit. When the well plate means is tipped from the horizontal position into a substantially vertical orientation the switch-hook is released such that the telephone set is connected to the telephone system circuit and thereby energized permitting a call to be placed or answered.

A lever means having a first end and a second end is provided for facilitating the tipping of the well plate means within the handset well. The first end of the lever means is operably affixed to the top facing surface of the well plate means leaving the second end free, the lever means thereby serving as a handle. In the preferred embodiment of the invention, the lever means is of such a length and has such a mass that the center of mass of the overall telephone switch-hook actuator apparatus is positioned so as to promote the tipping of the well plate means from its horizontal position to a substantially vertical position. Additionally, the first end of the lever means may be affixed away from center of the well plate means to similarly promote and facilitate the tipping of the well plate means.

In one embodiment of the invention, the well plate means further includes a groove extending along the bottom facing surface of the well plate means. This groove substantially corresponds to the size and location of the switch-hook within the handset well. The groove serves to permit the well plate means to rest substantially flat upon the bottom surface of the handset well and accordingly prevent any rocking of the well plate means on the telephone set in situations where the switch-hook, when fully depressed, nevertheless protrudes above the bottom surface of the handset well.

In the preferred embodiment of the invention, the thickness of the well plate means is tappered such that its weight is concentrated toward the edge of the well plate means which remains in contact with the surface of the handset well as the well plate means is tipped. The tappering thus serves to position the center of mass of the telephone switch-hook actuator apparatus so as to promote and facilitate the tipping of the well plate means from its horizontal position to its vertical position. Similarly, the concentration of weight toward the portion of the well plate means which continually remains in contact with the handset well surface serves to substantially diminish the impact of the well plate means upon the handset well as the well plate means is tipped from its vertical position to its horizontal position.

The preferred embodiment of the invention further incorporates a well plate means wherein the edge which remains in contact with the surface of the handset well is rounded so as to further facilitate the tipping of the well plate means from one position to another.

The lever means which is affixed to the well plate means is preferably attached thereto in an angled fashion to, in part, facilitate the tipping of the well plate means. The positioning of the free end of the lever means achieved by the angled affixation serves to minimize the force needed to overcome the moment of the well plate means in its horizontal position. Additionally, the length and angle of the lever means serve to control the vertical position of the well plate means when it is tipped into its vertical orientation as the free end of the lever means will rest upon the surface of the telephone set has a handset well which ranges from ⅜" to ½" in depth, a relatively standard size length lever means may be utilized, though it is contemplated that the length and angle of the lever means may be altered to conform to telephone sets having handset wells whose depths are beyond the range normally encountered.

In the preferred embodiment of the invention, the telephone switch-hook actuator apparatus is case as a single assembly. It is further contemplated that the apparatus may be composed of an aluminum alloy material, though any material which is sufficient in weight to depress the switch-hook without damaging the surface of the telephone set during use will suffice. It is additionally contemplated that the entire telephone switch-hook actuator apparatus would be coated with a substantially resilient plastic material which will serve to prevent the finish of the telephone set from being damaged as the apparatus repeatedly falls upon the surface of the handset well.

In operation, it is contemplated that the conventional handset will be replaced by a headset worn by an operator which would permit the operator to carry on a telephone conversation without having to hold on to the handset for the entire conversation. When the operator wishes to make a call or is required to answer an incoming call, the well plate means is tipped into a vertical position by merely placing the free end of the lever means against the telephone set surface, thus releasing the telephone switch-hook. The balance achieved by the construction and weighting of the telephone switch-hook actuator apparatus minimizes the amount of force necessary to tip the well plate means. After the call is completed the telephone operator need only tap the now vertically raised portion of the well plate means causing it to fall back into a horizontal position, thereby depressing the switch-hook and disconnecting the telephone. The balance and waiting of the apparatus along with the protective coating serve to minimize the potential for scratching or otherwise marring the appearance of the telephone set as the weight plate falls into its horizontal position against the bottom surface of the handset well.

DETAILED DESCRIPTION OF THE DRAWINGS

Figure 3:
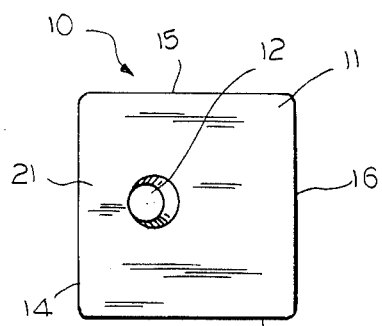
FIG. 3 of the drawings is a top view of the telephone switch-hook actuator apparatus specifically showing the position of the affixed lever means.

While the invention is susceptible of embodiment in many different forms, there is shown in the drawing and will herein be described in detail several specific embodiments, with the understanding that the present disclosure is to be considered an an exemplification of the principles of the invention and is not intended to limit the invention to the embodiment illustrated.

Figure 1:
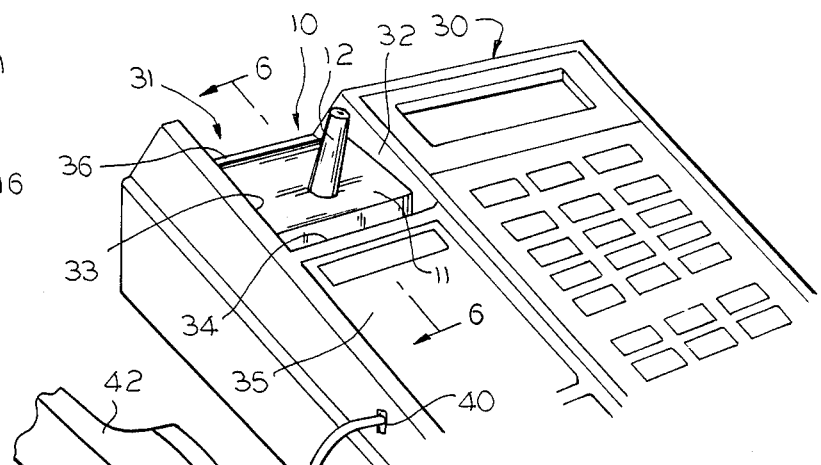
FIG. 1 of the drawings is a side-perspective view of the telephone set incorporating a conventional handset and a handset well in which is shown positioned, in a horizontal position, the telephone switch-hook actuator apparatus.

Telephone switch-hook actuator apparatus 10 is shown in FIG. 1 in its horizontal position, within handset well 31 of telephone set 30. Telephone set 30 is shown as a conventional telephone apparatus including a typical handset 42 connected to telephone set 30 via cord 41 and jack 40. Protruding through the bottom surface 36 of handset well 31 is switch-hook 50 shown covered and depressed by telephone switch-hook actuator apparatus 10. Specifically, handset well 31 includes bottom surface 36, side walls 32 and 33 as well as front edge 34. Top surface 35 of telephone set 30 is shown elevated above the bottom surface 36 of the handset well 31. The apparatus 10 is shown composed of well plate means 11 and lever means 12.

In FIG. 1 actuator apparatus 10 is shown in its horizontal position, depressing switch-hook 50. Accordingly, even though the handset 42 is removed from its resting place within handset well 31, a telephone set 30 remains disconnected from the telephone line circuit due to the placement of actuator apparatus 10.

Figure 2:
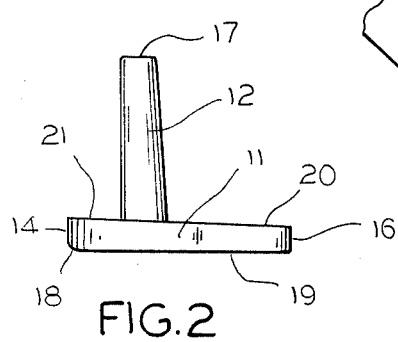
FIG. 2 of the drawings is a side-view of the telephone switch-hook actuator apparatus specifically illustrating the tappered thickness and rounded edge of the well plate means, and the angled affixation of the lever means.

FIG. 2 of the drawings if a side elevational view of telephone switch-hook actuator apparatus 10. The apparatus 10 is shown composed principally of two parts, well plate means 11 and lever means 12. Specifically, well plate means is shown having a top surface 20 and a bottom surface 19, where bottom surface 19 can rest flush against bottom surface 36 of handset well. In operation, end 14 of apparatus 10 is positioned proximate to edge 34 of handset well 31. The lower surface of edge 14 is shown rounded, denoted by numeral 18, to facilitate the tipping of the apparatus 10. Lever means 12 is shown having a first end and a free end 17 where the first end is operably affixed to top surface 20. As can be seen in the drawings, lever means 12 is offset with respect to its lateral position, designated by numeral 21.

FIG. 3 of the drawings is a top view of the telephone switch-hook annunciator apparatus 10 specifically illustrating the shape of the well plate means 11. Well plate means 11 is illustrated as a substantially square member having sides 13, 14, 15 and 16, wherein side 14 is oriented against edge 34 of handset well 31. The offset positioning of lever means 12 and angled affixation with respect to well plate means 11 are shown.

Figure 4:
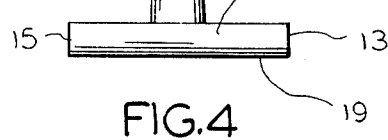
FIG. 4 of the drawings is a front elevational view of the telephone switch-hook actuator apparatus.

A front elevational view of the apparatus 10 is illustrated in FIG. 4 wherein the proportional length of lever means 12 with respect to plate means 13 is apparent. Additionally, lever means 12 is shown as a tapered rod protruding upwardly from well plate means 11.

Figure 5:
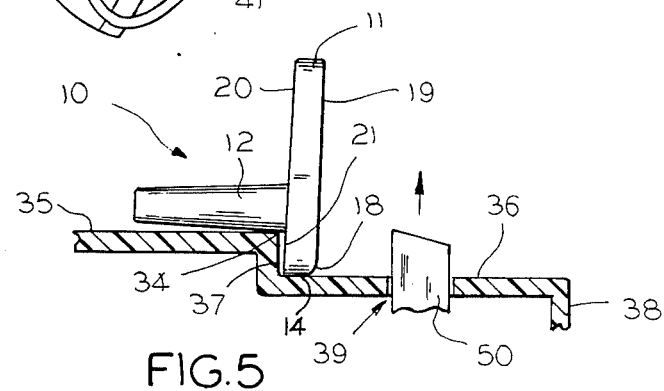
FIG. 5 of the drawings is a cross-sectional view of the handset well and switch-hook specifically illustrating the vertical positioning of the telephone switch-hook actuator apparatus.

FIG. 5 of the drawings is a cross-sectional view taken through handset well 31 specifically illustrating the telephone switch-hook actuator apparatus 10 in its vertically tipped position. Switch-hook 50 is shown in its released position protruding upwardly through hole 39 positioned in the bottom surface 36 of handset well 31. In this vertical position the switch-hook 50 is released, thereby permitting the telephone operator to answer an incoming or make an outgoing telephone call. Rounded edge 18 of well plate means 11 serves to promote the rocking of the apparatus 10 from its horizontal into its vertical position. It can be seen that the tapering of the well plate means 11 which concentrates the weight of the telephone switch-hook apparatus 10 toward end 14 serves to alter the center of mass of the telephone switch-hook apparatus 10. Further, the length of lever means 12 and its positioning on the top surface 20 of well plate means 11, and the distance indicated as 21, serves to further position the center of mass of the telephone switch-hook apparatus 10 such that a minimum amount of force is required to tip the telephone switch-hook apparatus 10 from its horizontal position into its vertical position, as illustrated here. Additionally, it can be seen that the distance 21 and the length of lever means 12 will permit the apparatus to be used with a variety of telephone set devices 30 having a variety of handset well depths 37. The particular telephone set 30 illustrated in FIG. 1 has a handset well 31 having an open rear side 38.

Figure 6:
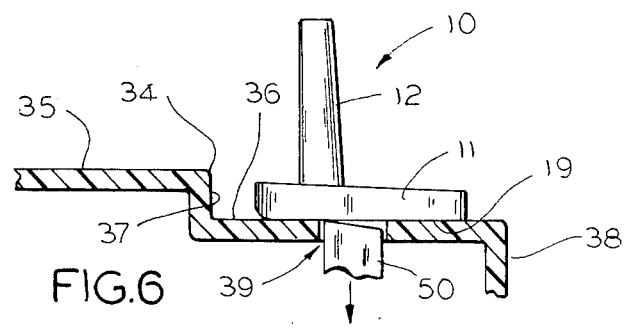
FIG. 6 of the drawings is a side cross-sectional view of the handset well and switch-hook specifically illustrating the horizontal positioning of the telephone switch-hook actuator apparatus.

FIG. 6 illustrates a cross-sectional view of telephone switch-hook actuator apparatus 10 and handset well 31 specifically illustrating the apparatus 10 in its horizontal depressed position. Switch-hook 50 is shown in a depressed position caused by the weight of telephone switch-hook apparatus 10 when positioned against the bottom surface 36 of handset well 31. In order to tip the telephone switch-hook apparatus 10 from its horizontal into its vertical orientation, the operator need only place a finger against lever means 12 and bring lever means 12 in contact with the top surface 35 of telephone set 30. Thus it can be seen that the placement of apparatus 10 within handset well 31 serves to operate switch-hook 50 in place of handset 42.

Figure 7:
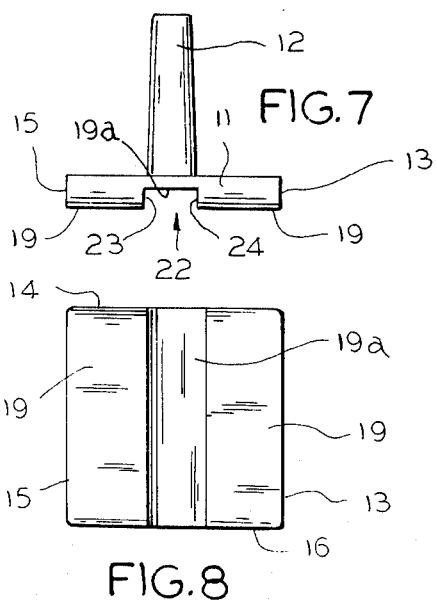
FIG. 7 of the drawings is a front elevational view of an alternative embodiment of the telephone switch-hook actuator apparatus specifically illustrating the groove cut into the bottom surface of the well plate means.

An alternative embodiment of the invention is shown in FIG. 7 wherein groove 22 is shown fashioned into the bottom surface 19 of well plate means 11. The groove serves to create a cavity along the bottom surface 19 having sides 23 and 24 and a bottom facing surface designated 19a.

Figure 8:
FIG. 8 of the drawings is a bottom view of an alternative embodiment of the telephone switch-hook actuator apparatus.

FIG. 8 of the drawings is a bottom view of this alternative embodiment of the invention illustrating the groove 22 passing from the forward edge 14 to the rearward edge 16 of well plate means 11.

Figure 9:
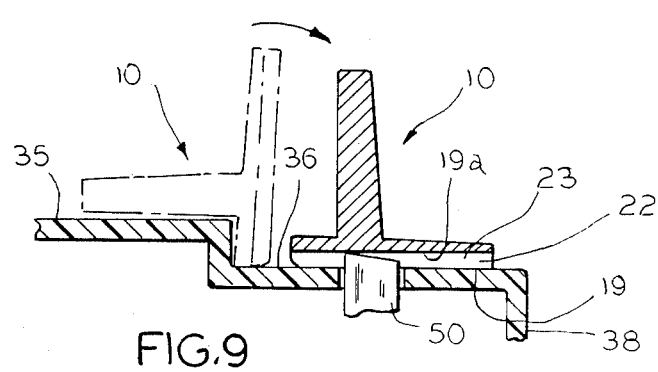
FIG. 9 of the drawings is a cross sectional view of the telephone handset well apparatus and switch-hook specifically illustrating the operation of the alternative embodiment of the invention.

The function of this alternative embodiment of the telephone switch-hook apparatus 10 is illustrated in FIG. 9. It can be seen that the alternative embodiment of the telephone switch-hook apparatus 10 functions as previously described herein when the apparatus 10 is in its vertical position. In this position, the switch-hook 50 is released thereby completing the telephone circuit. However, when the telephone switch-hook apparatus 10 is in its horizontal depressed position, groove 22 serves to maintain the bottom facing surface 19 of well plate means 11 in substantially flat contact with the bottom surface 36 of handset well 31 while still depressing switch-hook 50 and disconnecting telephone set 30. This construction of the apparatus 10 including groove 22 serves to prevent the telephone switch-hook apparatus 10 from rocking within handset well 31 when in a horizontal depressed position when used with telephone set 30 having a switch-hook 50 which when fully depressed nevertheless protrudes above the bottom surface 36 of handset well 31, as illustrated here. In the embodiment illustrated, the position and dimension of groove 22 serves to permit the apparatus 10 to be used with telephone units having a variety of switch-hook 50 sizes and positions.

It is within the scope of the invention, however, that this groove 22 may be repositioned and further need not extend along the entire bottom face and surface in certain applications.

The foregoing description and drawings merely explain and illustrate the invention and the invention is not limited thereto, except insofar as the amended claims are so limited as those skilled in the art who have the disclosure before them will be able to make modifications and variation therein without departing from the scope of the invention.

What is claimed is:

1. A telephone switch-hook actuator apparatus for use with a telephone set incorporating a handheld handset which rests within a handset well through which protrudes a telephone switch-hook whereby said telephone switch-hook actuator apparatus, having a positioned center of mass, serves to operate said telephone switch-hook in place of said handset thereby permitting the use of a remote headset with said telephone set, said telephone switch-hook actuator apparatus comprising:

well plate means having a top surface and a bottom surface positioned within the handset well of said telephone set proximate to said switch-hook whereby said well plate means may be tipped from a horizontal position to a vertical position within said handset well for respectively depressing and releasing said telephone set switch-hook such that said telephone set is deactivated in said respective depressed horizontal position and where said telephone set is activated in said respective released vertical position;

lever means having a first end and a second end where said second end is operably affixed to said well plate means for facilitating the tipping of said well plate means, said lever means being of such length and affixed to said well plate means so as to releasably retain said well plate means in a substantially vertical position and so as to position said center of mass of said telephone switch-hook actuator apparatus in a manner which facilitates the tipping of said well plate means from said vertical position to said horizontal position.

2. The telephone switch-hook actuator apparatus of claim 1 in which said well plate means further includes a groove extending along the bottom surface of said well plate means substantially corresponding to the size and location of said switch-hook within said handset well, said groove permitting said well plate means to rest substantially flat upon said handset well preventing the rocking of said apparatus in handset wells of telephone sets where said switch-hook protrudes into said handset well when fully depressed.

3. The telephone switch-hook actuator apparatus according to claim 1 in which the thickness of said well plate means is tapered to position said center of mass of said telephone switch-hook actuator apparatus and to prevent damage to said telephone and switch-hook as said well plate means is tipped from its vertical position to its horizontal position.

4. The telephone switch-hook actuator apparatus according to claim 1 in which said lever means is affixed to said well plate means in an angled fashion so as to facilitate the tipping of said well plate means.

5. The telephone switch-hook actuator apparatus according to claim 1 in which said telephone switch-hook actuator apparatus is cast as a single assembly.

6. The telephone switch-hook actuator apparatus according to claim 1 in which said telephone switch-hook actuator apparatus is composed of an aluminum alloy material.

7. The telephone switch-hook actuator apparatus according to claim 1 in which said telephone switch-hook actuator apparatus is coated with a substantially compressible plastic material so as to prevent the appearance of said telephone set from being damaged as the telephone switch-hook actuator apparatus falls from the vertical to the horizontal position in said handset well.

* * * * *

UNITED STATES PATENT AND TRADEMARK OFFICE
CERTIFICATE OF CORRECTION

PATENT NO. : 4,742,542

DATED : May 3, 1988

INVENTOR(S) : Jantzi

It is certified that error appears in the above-identified patent and that said Letters Patent is hereby corrected as shown below:

Col. 1, line 7      "to a telephole" should be instead -- to a telephone --

Col. 1, line 11      "to operate the telephole" should be instead -- to operate the telephone --

Col. 1, line 11-12      "the use of the telephole" should be instead -- the use of the telephone --

Col. 1, line 35      "the telephole" should be instead -- the telephone --

Col. 2, line 48      "that the diameter" should be instead -- that the dimension --

Col. 3, lines 56-57      "telephone set has a handset" should be instead -- telephone set proximate to the handset well. As a typical telephone has a handset --

UNITED STATES PATENT AND TRADEMARK OFFICE
CERTIFICATE OF CORRECTION

PATENT NO. : 4,742,542

DATED : May 3, 1988

INVENTOR(S) : Jantzi

It is certified that error appears in the above-identified patent and that said Letters Patent is hereby corrected as shown below:

| | |
|---|---|
| Col. 3, line 64 | "apparatus is case" should be instead -- apparatus is cast -- |
| Col. 5, line 8 | "considered an an" should be instead -- considered as an -- |
| Col. 5, line 28 | "a telephone set 30" should be instead -- the telephone set 30 -- |
| Col. 5, line 31 | " if aside" should be instead -- is a side -- |

Signed and Sealed this

Twenty-second Day of August, 1989

Attest:

DONALD J. QUIGG

Attesting Officer

Commissioner of Patents and Trademarks